Figure 1:
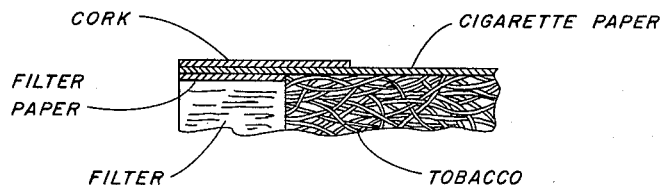

June 22, 1965   G. P. TOUEY ETAL   3,190,295
FILTER WITH COMBINATION PLASTICIZER
Filed Dec. 21, 1962

GEORGE P. TOUEY
JOHN E. KIEFER
INVENTOR.

BY
ATTORNEYS

United States Patent Office 3,190,295
Patented June 22, 1965

3,190,295
FILTER WITH COMBINATION PLASTICIZER
George P. Touey and John E. Kiefer, Kingsport, Tenn., assignors to Eastman Kodak Company, Rochester, N.Y., a corporation of New Jersey
Filed Dec. 21, 1962, Ser. No. 246,361
4 Claims. (Cl. 131—208)

This invention relates to an improved plasticized filter for the selective removal of certain undesirable components from tobacco smoke. In particular, it relates to the addition of certain combinations of esters to a tobacco smoke filter made from a crimped tow of cellulose acetate to enhance its capacity for removing phenols from the smoke.

Filters from crimped tows of cellulose acetate fibers are well known to the art. These filters have pronounced processing advantages over prior art filters. Some of the more important of these are the rapidity at which they can be continuously manufactured from a bale or roll of tow and the ease at which the crimped continuous fibers can be coalesced together by means of nontacky plasticizers to impart rigidity to the finished filter rod. U.S. Patents 3,003,504 and 3,008,474 describe some plasticizers which are satisfactory bonding agents for crimped tow filters. These plasticizers are illustrated by esters of glycerine, ethylene glycol, and propylene glycol or phthalic acid ester plasticizers such as dimethoxy ethyl phthalate, methyl phthalyl ethyl glycollate, and dimethyl phthalate.

Although such a method for making a firm cigarette filter from a tow of cellulose acetate fibers has been quite satisfactory, it has been found that the plasticizer-type bonding agents used heretofore have some limitations. One of these is that although the prior plasticizers made a rod of satisfactory firmness they did not enhance the filter's capacity for removing selectively certain undesirable components from the smoke. This was because after a period of storage the plasticizers used heretofore gradually diffused into the fibres. Thus, although they may have had a stronger affinity than the cellulose acetate fibers without plasticizer for a certain component of the smoke, this advantage may be lost by the time the filter was actually used. For example, a cellulose acetate filter with about 6 to 12 percent glycerol triacetate on its fiber surfaces removes more phenol from cigarette smoke than the same filter without the triacetin on its surface. However, when the filter has aged for a few weeks this plasticizer apparently diffuses into the fibers. As a result the aged filter, though still firm, is in many instances no more effective for removing phenol than a control filter of the same type but without glycerol triacetate. Somewhat similar results were obtained from tests on all of the other plasticizers which, heretofore, have been most frequently recommended as bonding agents for cellulose acetate filters.

Hence it is apparent fom the foregoing that the development of a plasticizer material which will not diffuse, or diffuses less rapidly, into the filter product represents a highly desirable result. After extended investigation we have discovered certain plasticizer combinations which are useful in filter rod manufacture as will be described in more detail hereinafter.

One object of this invention is to disclose a method for producing a plasticizer-hardened filter of cellulose acetate tow fibers which selectively removes a high percentage of phenol from cigarette smoke and which maintains this high capacity for phenol absorption after months of storage. Another object is to disclose a method for producing an improved, plasticizer bonded cellulose acetate filter with existing, available plasticizer materials. Other objects will appear hereinafter.

In the broader aspects of this invention these objects are accomplished by applying certain ester combinations to a crimped cellulose acetate tow, and then forming the tow into filter rods by any of the methods described in the prior art. For example, the ester combination may be sprayed onto the tow by means of a spray gun or it may be applied by means of a wicking device.

For a better understanding of our invention, reference is made to the drawing which forms a part hereof. In the drawing, FIG. 1 is a transverse section of a portion of a cigarette with a filter rod such as that of this invention attached.

Figure 2:
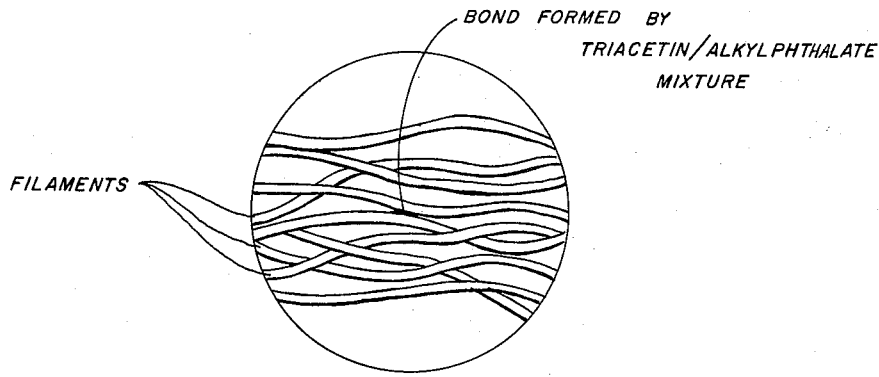

FIG. 2 is an enlargement of the filter section of FIG. 1 showing the filaments bonded with phenol-removing combination of compounds according to this invention.

An illustration of an ester combination which has special merit comprises glycerol triacetate containing a substantial content of an alkyl phthalate mixed or incorporated therewith. A further understanding of such plasticizer combination and other features of our invention will be apparent from the examples which follow and which illustrate some of our preferred embodiments.

EXAMPLE I

Nine sections of tow, each consisting of 12,000 cellulose acetate fibers of 5 denier per filament and crimped to 12 crimps per inch, were spread out and sprayed with a plasticizer. The plasticizers which were used are shown in Table 1 which follows. The tow which contained the plasticizers were processed into filter rods on a standard filter rod-making machine. After the rods were stored at room temperature for 24 hours, they were evaluated in regard to their firmness. Samples 1 (control), 4 (diethyl phthalate), and 5 (dioctyl phthalate) were soft and difficult to cut and attach to cigarettes with the automatic equipment now being used for manufacturing filter cigarettes. The filters which were bonded with triacetin (2 and 3) and those bonded with the new combinations disclosed in this invention (6, 7, 8 and 9) were firm and were easily cut and processed into filter cigarettes.

Each type of filter rod was cut into 17 mm. lengths and attached to a domestic brand of cigarette. The cigarettes were smoked on an automatic smoking machine. The smoke was collected and analyzed for its phenol content according to the method described by D. Hoffman and E. L. Wynder, Beitrage zur Tobakforschung Heft 3, 101–106, August 1961. The smoking experiment was repeated after the filter rods had been aged at room temperature for 4 weeks. The data obtained from these experiments are recorded in Table 1.

Table 1

| Sample No. | Bonding agent | Hardness | Mg. phenol found in smoke from 100 filter cigarettes | |
|---|---|---|---|---|
| | | | Aged 1 day | Aged 4 weeks |
| 1 | None—control | Soft | 7.0 | 7.1 |
| 2 | 6.7 percent triacetin | Firm | 5.9 | 6.9 |
| 3 | 10.3 percent triacetin | do | 4.7 | 6.7 |
| 4 | 11.2 percent diethyl phthalate | Soft | | |
| 5 | 10.9 percent dioctyl phthalate | do | | |
| 6 | 6.4 percent (60:40 triacetin:diethyl phthalate) | Firm | 5.7 | 5.7 |
| 7 | 10.4 percent (60:40 triacetin:diethyl phthalate) | do | 4.6 | 4.8 |
| 8 | 6.6 percent (80:20 triacetin:dioctyl phthalate) | do | 5.4 | 5.6 |
| 9 | 11.1 percent (80:20 triacetin:dioctyl phthalate) | do | 4.4 | 4.5 |

EXAMPLE II

A tow consisting of 12,000 cellulose acetate fibers of 5 denier per filament and 12 crimps per inch was spread out and sprayed with 5 percent triacetin. One portion of the tow was then processed into filter rods on a standard machine. The other portion of the tow was sprayed with 6 percent dibutyl phthalate. This tow was also made into filter rods by the same procedure. Both sets of rods were firm. The rods were cut into 17 mm. lengths and attached to a domestic brand of cigarettes. The cigarettes were smoked with an automatic smoking machine. The smoke was collected and analyzed for its phenol content.

The smoking experiment was repeated after the filter rods had aged at room temperature for 4 weeks. The results of the smoking tests are listed in Table 2 below.

*Table 2*

| Sample | Bonding agent | Mg phenol found in smoke from 100 filter cigarettes | |
|---|---|---|---|
| | | Aged 1 day | Aged 4 weeks |
| A | 6 percent triacetin | 5.8 | 6.8 |
| B | 6 percent triacetin plus 6 percent dibutyl phthalate | 5.2 | 5.1 |

The esters which can be used in carrying out this invention can be mixed together before applying to the cellulose acetate as was illustrated in Example I, or they can be applied separately as was done in Example II. The preferred method is to mix the triacetin with the alkyl phthalate ester before addition to the cellulose acetate fibers. From about 5–20 percent of the alkyl phthalate mixed with the primary ester is usually satisfactory and 6–12 percent represents the preferred range. While as indicated in the above example, we prefer to use cellulose acetate tow, other tow of plasticizable fibers as the mixed organic esters of cellulose may be used but would be more expensive and less readily available.

Although the invention has been described in considerable detail with particular reference to certain preferred embodiments thereof, variations and modifications can be effected within the spirit and scope of the invention as described hereinabove and as defined in the appended claims.

We claim:
1. As an article of manufacture a filter rod adapted for use in filtering tobacco smoke, said rod being comprised principally of a bundle of continuous substantially horizontally aligned plasticizable filaments some of which are intermingled carrying thereon from about 5 to 20 percent by weight of said filaments of a combination of compounds, said combination comprising a plasticizing ester mixed with a dialkyl orthophthalate wherein the alkyl group is unsubstituted, said combination resulting in minimal diffusion of said ester into the filaments upon storage and assisting in bonding the filaments while at the same time improving the phenol removal ability of the filter rod.

2. The filter rod of claim 1 wherein the combination comprises as plasticizing ester triacetin and as dialkyl orthophthalate a compound selected from the group consisting of diethyl phthalate, dibutyl phthalate and dioctyl phthalate.

3. In a process of making filter rods from a bundle of filaments the step which comprises applying to a bundle of continuous filaments substantially horizontally aligned with some intermingling of said filaments before forming said filaments into filter rods a phenol-removing agent essentially comprised of a combination of 60 to 80 parts of glycerol triacetate with 40 to 20 parts of a dialkyl orthophthalate wherein the alkyl group is unsubstituted, which combination assists in bonding the filaments, does not materially diffuse into the filaments on storage of the rods and increases the phenol removal ability of the rods.

4. The process of claim 3 wherein the dialkyl orthophthalate is selected from the group consisting of diethyl phthalate, dibutyl phthalate and dioctyl phthalate.

References Cited by the Examiner

UNITED STATES PATENTS 3,026,226    3/62    Touey et al. _____ 131—208

OTHER REFERENCES

Arshid, Giles and Jain "Studies in Hydrogen-Bond Formation Part V. Complex-forming Properties of Esters and their Relation to the Adsorption Properties of Cellulon Acetile and Other Polymers" pages 1272 to 1277 incl. of The Journal of the Chemical Society.

"Tobacco" (pub.) June 8, 1962 "Lorillard Smoke Study Showed Damaged Cilia" pages 26 and 27.

ABRAHAM G. STONE, *Primary Examiner.*

MELVIN D. REIN, *Examiner.*